United States Patent
Wilmot

(10) Patent No.: US 7,287,044 B2
(45) Date of Patent: Oct. 23, 2007

(54) REAL-TIME DATABASE UPDATE TRANSACTION WITH DISCONNECTED RELATIONAL DATABASE CLIENTS

(75) Inventor: Gerald J. Wilmot, Marina, CA (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 11/204,836

(22) Filed: Aug. 15, 2005

(65) Prior Publication Data

US 2006/0010178 A1    Jan. 12, 2006

Related U.S. Application Data

(63) Continuation of application No. 10/187,916, filed on Jul. 1, 2002, now Pat. No. 6,996,583.

(51) Int. Cl.
*G06F 12/00* (2006.01)
*G06F 17/30* (2006.01)

(52) U.S. Cl. ................. 707/201; 707/10; 707/203
(58) Field of Classification Search ................ None
See application file for complete search history.

(56) References Cited

U.S. PATENT DOCUMENTS

| | | | | |
|---|---|---|---|---|
| 5,826,269 | A | 10/1998 | Hussey | 707/10 |
| 5,884,325 | A * | 3/1999 | Bauer et al. | 707/201 |
| 5,991,771 | A | 11/1999 | Falls et al. | 707/202 |
| 6,034,621 | A | 3/2000 | Kaufman | 340/7.21 |
| 6,230,156 | B1 | 5/2001 | Hussey | 707/10 |
| 6,597,772 | B1 | 7/2003 | Fleming, III | 379/93.25 |
| 6,654,746 | B1 * | 11/2003 | Wong et al. | 707/10 |
| 6,694,353 | B2 | 2/2004 | Sommerer | 709/206 |
| 6,816,074 | B2 | 11/2004 | Wong | 340/569 |
| 6,882,313 | B1 * | 4/2005 | Fan et al. | 342/457 |

FOREIGN PATENT DOCUMENTS

| | | |
|---|---|---|
| JP | 408221435 | 8/1996 |
| JP | 410063589 | 3/1998 |
| JP | 411272538 | 10/1999 |

OTHER PUBLICATIONS

IBM "Solving Time of Day Problems when Using DB2 Timestamp in Optimistic Lock Implementation", IBM Technical Disclosure Bulletin, vol. 35, No. 2, Jul. 1992, pp. 420-422.*

(Continued)

*Primary Examiner*—Luke S Wassum
(74) *Attorney, Agent, or Firm*—Sawyer Law Group LLP

(57) ABSTRACT

A method and system for performing real-time database update transactions with disconnected database clients includes a disconnected client server (DCS) and disconnected client extensions (DCE). The DCS formats the database cell, its key, any associated database cells, and a timestamp and sends them to a disconnected database client by email. The timestamp indicates the last time the database cell or associated database cells was changed. The disconnected database client sends a reply email with the update of the database cell and the timestamp. Upon receipt of the reply email, the DCS compares the received timestamp to a current timestamp for the database cell. If they match, then the database cell is updated according to the received update. If they do not match, then the update is based on outdated information and is rejected. In this manner, reliable real-time update transactions are provided between a disconnected database client and the database.

14 Claims, 4 Drawing Sheets

OTHER PUBLICATIONS

"Solving Time of Day Problems When Using DB2 Timestamp in Optimistic Lock Implementation," IBM Technical Disclosure Bulletin, vol. 35, No. 2, Jul. 1991, pp. 420-422.

Allison, D., "Mail-Enabled Applications with MAPI", Data Based Advisor, vol. 13, No. 11, Dec. 1995, pp. 94-96.

Roti, S., "Sybase SQL Anywhere," DBMS, vol. 9, No. 7, Jun. 1996, pp. 31-33.

"Updates From the Field," Varbusiness, No. 1220, Dec. 1, 1996, p. 60.

* cited by examiner

REAL-TIME DATABASE UPDATE TRANSACTION WITH DISCONNECTED RELATIONAL DATABASE CLIENTS

CROSS-REFERENCE TO RELATED APPLICATIONS

This application is a Continuation of U.S. patent application Ser. No. 10/187,916 (now U.S. Pat. No. 6,996,583), entitled "Real-Time Database Update Transaction With Disconnected Relational Database Clients," filed on Jul. 1, 2002.

FIELD OF THE INVENTION

The present invention relates to database systems, and more particularly to disconnected database clients of the database system.

BACKGROUND OF THE INVENTION

The updating of database cells by a client is known in the art. A "cell", as used in this specification, is a column/row intersection in a database table. For example, in the case of a remote or disconnected database client, to ensure reliability of updates, some conventional database systems either connect the remote client directly to the database system via a network or replicate the database, or a portion thereof, to create a local copy. If the client is connected directly to the database, the database locks the record containing the cell to be updated. The database rejects the client's update immediately if the database cell or its associated information is not valid or locked. However, many clients, such as cellular phones or personal digital assistants (PDAs), do not have the capability to connect directly to the database. Thus, this method is not an option.

If the database is replicated, the client updates a local copy of the database. At a later time, the client connects directly to the database system and the records from the updated copy are sent to the database. The database then either accepts or rejects the updates. However, many clients, such as cellular phones or PDAs, contain insufficient memory to store a local copy of the database. Thus, this method is not an option.

Accordingly, there exists a need for an improved method and system for performing real-time database update transactions with disconnected database clients. The method and system should ensure reliable updates without requiring the client to connect directly to the database or to replicate the database. The present invention addresses such a need.

SUMMARY OF THE INVENTION

A method and system for performing real-time database update transactions with disconnected database clients includes a disconnected client server (DCS) and disconnected client extensions (DCE). The DCS formats the database cell, its key, any associated database cells, and a timestamp and sends them to a disconnected database client by email. The timestamp indicates the last time the database cell or associated database cells was changed. The disconnected database client sends a reply email with the update of the database cell and the timestamp. Upon receipt of the reply email, the DCS compares the received timestamp to a current timestamp for the database cell. If they match, then the database cell is updated according to the received update. If they do not match, then the update is based on outdated information and is rejected. In this manner, reliable real-time update transactions are provided between a disconnected database client and the database.

DETAILED DESCRIPTION

The present invention provides an improved method and system for performing real-time database update transactions with disconnected database clients. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention utilizes a database client's ability to send and receive emails to perform real-time database update transactions. The system comprises a Disconnected Client Server (DCS) at a database server. The system further comprises Disconnected Client Extensions (DCE) and an Updateable Column Data Set (UCDS) at the database. In the preferred embodiment, the UCDS comprises the database cell to be updated and any associated database cells. The DCE comprises triggers, commands, and side tables for the management of the UCDS. The side tables comprise synchro timestamp checksum values (STCV) for the UCDS. The DCS formats the UCDS database cells, the key of the UCDS, and the STCV and sends them to a disconnected database client by email. The STCV indicates the last time any of the UCDS database cells were changed. The disconnected database client sends a reply email with a new value for the database cell to be updated and the STCV. Upon receipt of the reply email, the DCS compares the received STCV to a current STCV for the UCDS. If they match, then the database cell is updated with the new value, utilizing the extensions in the DCE. If they do not match, then the database cell to be updated or its associated database cells has been changed since the update request was created. The update is thus based on outdated information and is rejected.

To more particularly describe the features of the present invention, please refer to FIGS. 1 through 4 in conjunction with the discussion below.

Figure 1:
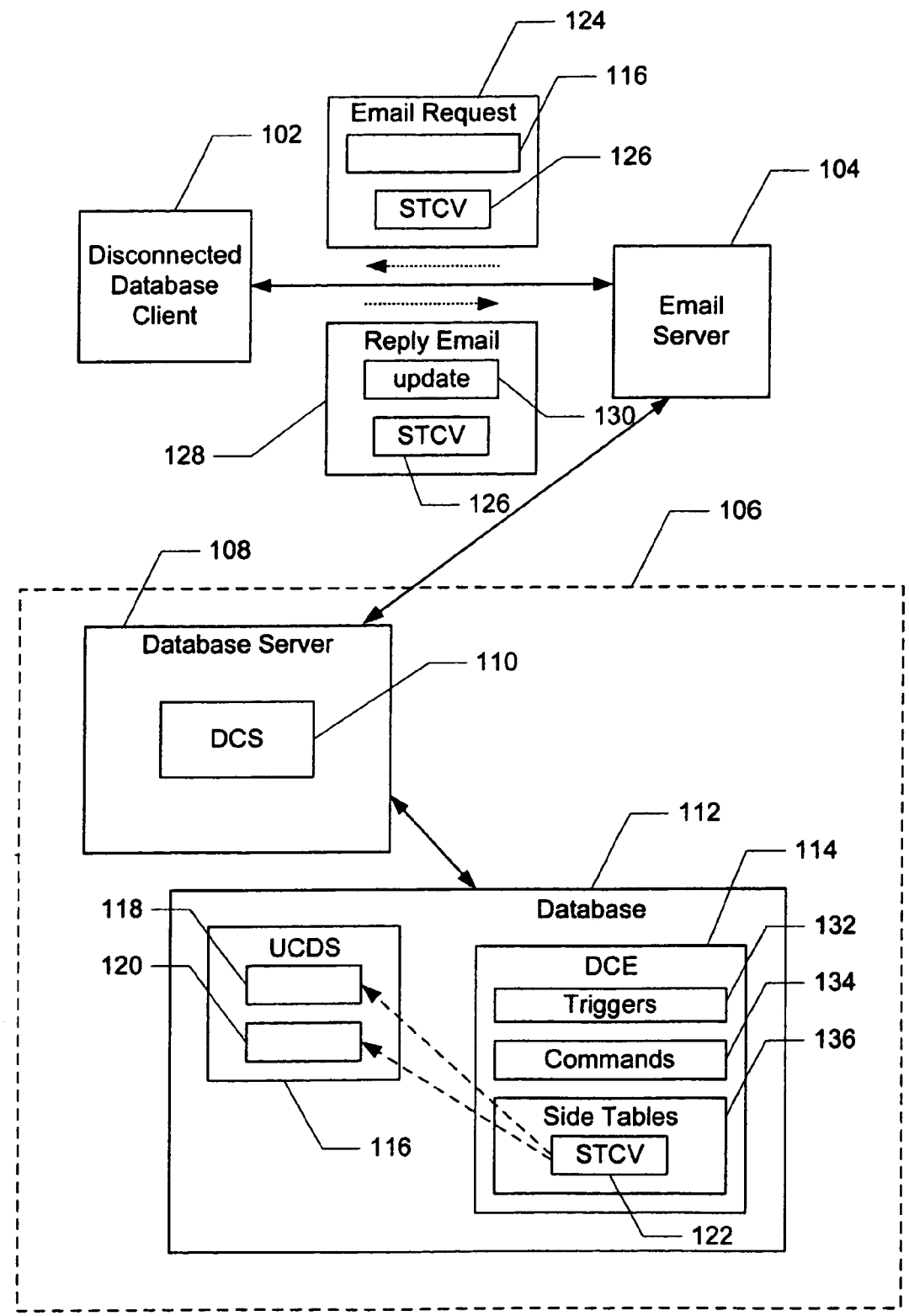
FIG. 1 illustrates a preferred embodiment of a system for performing real-time database update transactions with disconnected database clients in accordance with the present invention.

FIG. 1 illustrates a preferred embodiment of a system for performing real-time database update transactions with disconnected database clients in accordance with the present invention. The database system 106 comprises a database server 108 and a database 112. A disconnected database client 102 can exchange emails via an email server 104 with the database server 108.

The database 112 comprises the Disconnected Client Extensions (DCE) 114 and an Updateable Column Data Set (UCDS) 116. In the preferred embodiment, the DCE 114 comprises a set of update, insert and delete triggers 132, administration commands 134, and side tables 136 that are used to manage the UCDS 116. The UCDS 116 comprises one or more database cells 118 that will be updated and any associated database cells 120 with data that the client 102 may require for determining the extent of an update to the database cell 118. The side tables 136 of the DCE 114 comprises a set of references to the database cell 118 and a set of references to the associated database cells 120, and a STCV 122 for the UCDS 116. In the preferred embodiment, the STCV 122 comprises a timestamp indicating the last time the database cell 118 or its associated database cells 120 were changed and a checksum for error detection purposes. As the values in the UCDS 116 change, the STCV 122 is updated.

The database server 108 comprises a disconnected client server 110 (DCS). The DCS 110 is a conduit that takes the references in the side tables 136 for the UCDS 116 and retrieves the referenced database cell 118, referenced associated database cells 120, and the STCV 122 for the UCDS 116. The DCS 110 formats the database cells 118 and 120 and the STCV 122 for an email request 124. The email request 124 requests that the client 102 provide an update to the database cell 118. The email request 124 thus comprises the UCDS 116 and its STCV 126. At the time the email request 124 is created, the STCV 126 matches the STCV 122. However, if either the database cell 118 or its associated database cells 120 subsequently changes, then the STCV 122 would also change. The STCV's 126 and 122 would then no longer match. The DCS 110 also receives a reply email 128 from the client 102, comprising an update 130 containing a new value for the database cell 118 and the STCV 126 from the email request 124.

Figure 2:
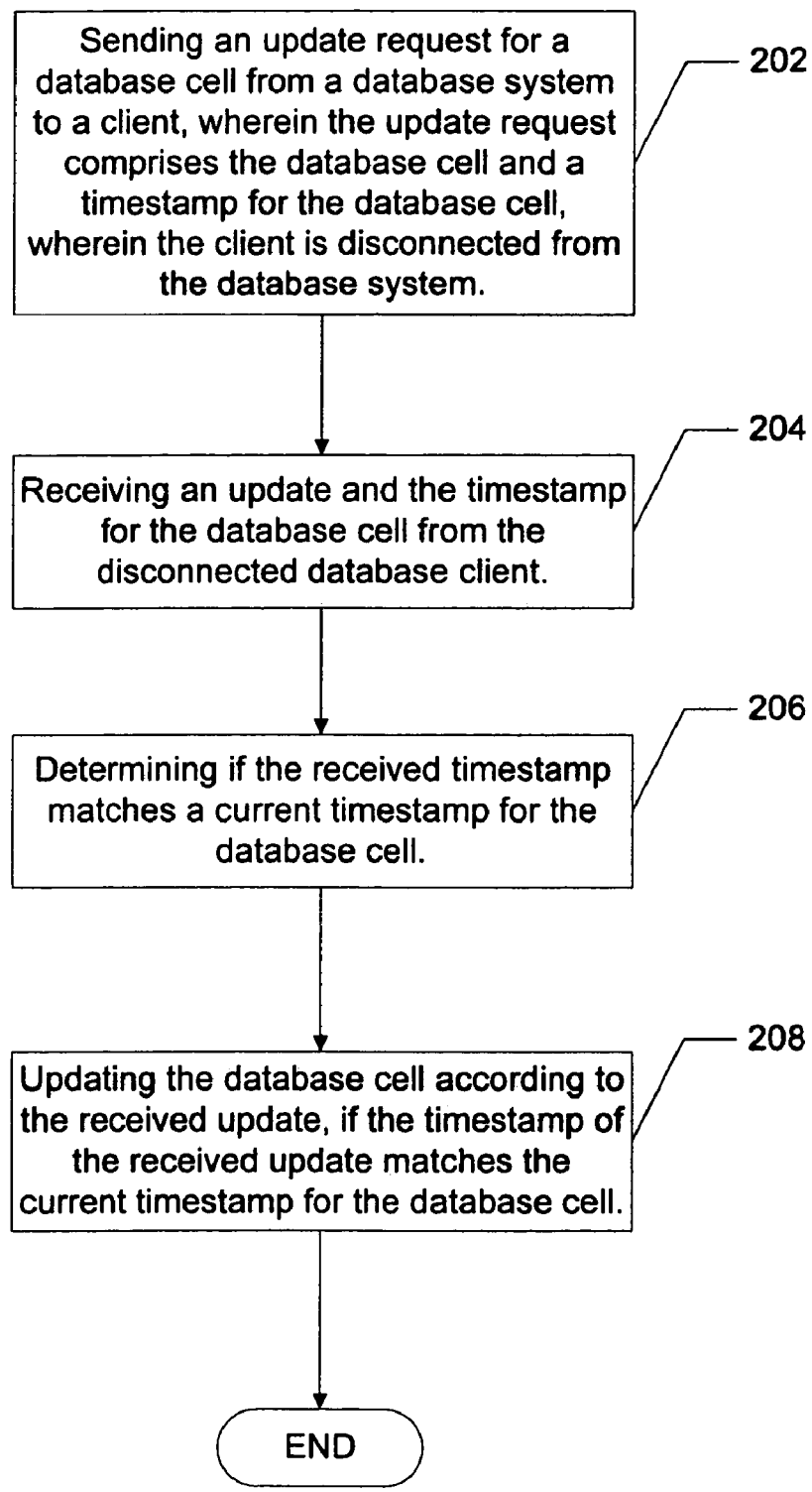
FIG. 2 is a flowchart illustrating a preferred embodiment of a method for performing real-time database update transactions with disconnected database clients in accordance with the present invention.

FIG. 2 is a flowchart illustrating a preferred embodiment of a method for performing real-time database update transactions with disconnected database clients in accordance with the present invention. First, an update request 124 for a database cell 118 is sent from the database system 106 to a remote client 102 that is disconnected from the database system 106, via step 202. The update request 124 comprises the database cell 118 to be updated and a timestamp 126 for the database cell 118. At the time the update request 124 is created, the timestamp 126 is the same as the timestamp 122. In the preferred embodiment, the timestamp 122 also includes a checksum value for the corresponding database cell's current state, forming the STCV 122.

Next, the database system 106 receives an update 130 and the timestamp 126 from the disconnected remote client 102, via step 204. The update 130 comprises a new value for the database cell 118. The database system 106 then determines if the received timestamp 126 matches a current timestamp 122 for the database cell 118, via step 206. If they match, then the database cell 118 is updated according to the received update 130, via step 208. In the preferred embodiment, the database cell 118 is updated with the new value. Otherwise, the update 130 is rejected.

Figure 3:
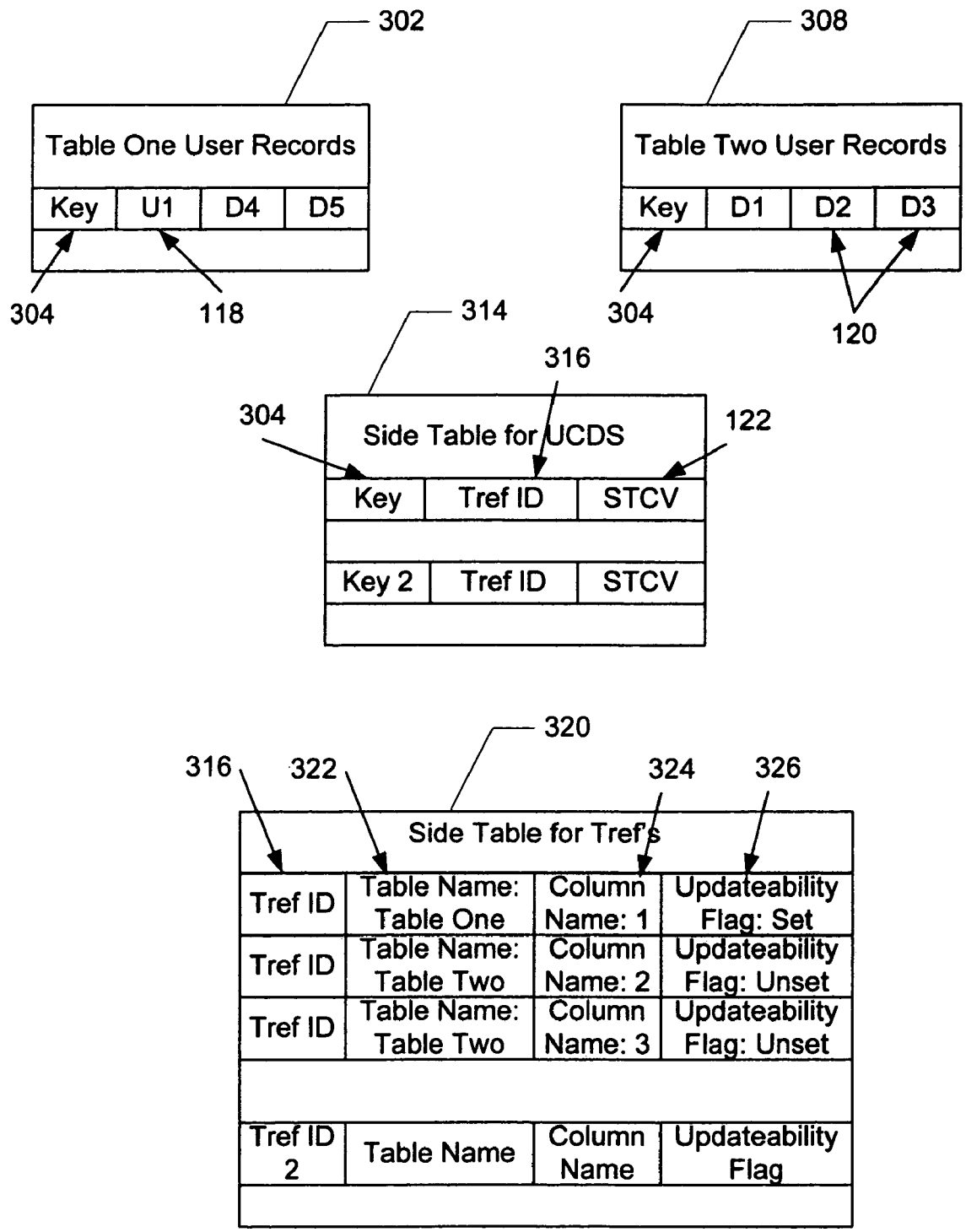
FIG. 3 illustrates in more detail an implementation of the side tables in accordance with the present invention.

For an update transaction in accordance with the present invention, the database 112 creates the UCDS 116 and the side tables 136 using the triggers 132 and commands 134 of the DCE 114. FIG. 3 illustrates in more detail an implementation of the side tables in accordance with the present invention. Assume that the database cell 118 comprise column U1 in the row identified by the key 304 in Table One 302. Also assume that the associated database cells 120 comprise columns D2 and D3 in the row identified by the key 304 in Table Two 308. Thus, columns U1, D2, and D3 comprise the UCDS 116 and have the same key 304.

The DCE 114 creates a side table 314 for the UCDS 116. The UCDS side table 314 comprises a UCDS record for the database cells 118 and 120. The UCDS record for the UCDS 116 contains the key 304, a unique Table Reference ID (Tref ID) 316 for the UCDS 116, and a STCV 122 for the UCDS 116. If more than one database cell is to be updated, then this database cell and its associated database cells would have a different key, such as Key 2. The UCDS side table 314 thus defines the database cells that are part of the UCDS 116 and corresponds these cells with their key 304 and the STCV 122.

References for each database cell in the UCDS 116 are also created in the side table 320 for the Tref ID 316. Each reference contains the Tref ID 316, a table name 322 and column name 324 pair, and an updateability flag 326. For example, the reference for U1 contains the Tref ID 316, "Table One" as the table name 322, "1" as the column name 324, and the updateability flag 326 is set since U1 is the database cell 118 to be updated. The reference for D2 contains the Tref ID 316, "Table Two" as the table name 322, "2" as the column name 324, and the updateability flag 326 is unset since D2 is an associated database cell 120 and is not to be updated. The reference for D3 contains the Tref ID 316, "Table Two" as the table name 322, "3" as the column name 324, and the updateability flag 326 is unset since D3 is an associated database cell 120 and is not to be updated.

In the preferred embodiment, the database 106 has one Tref side table 320 for all Table Reference ID's. The Tref side table 320 would thus contain the references for all of the UCDS's on the database 106. Thus, the side table 320 can also contain references for a second UCDS with Tref ID 2.

Although the side tables of the preferred embodiment is described above with the illustrated structure, one of ordinary skill in the art will understand that other table structures may be used without departing from the spirit and scope of the present invention.

Figure 4:
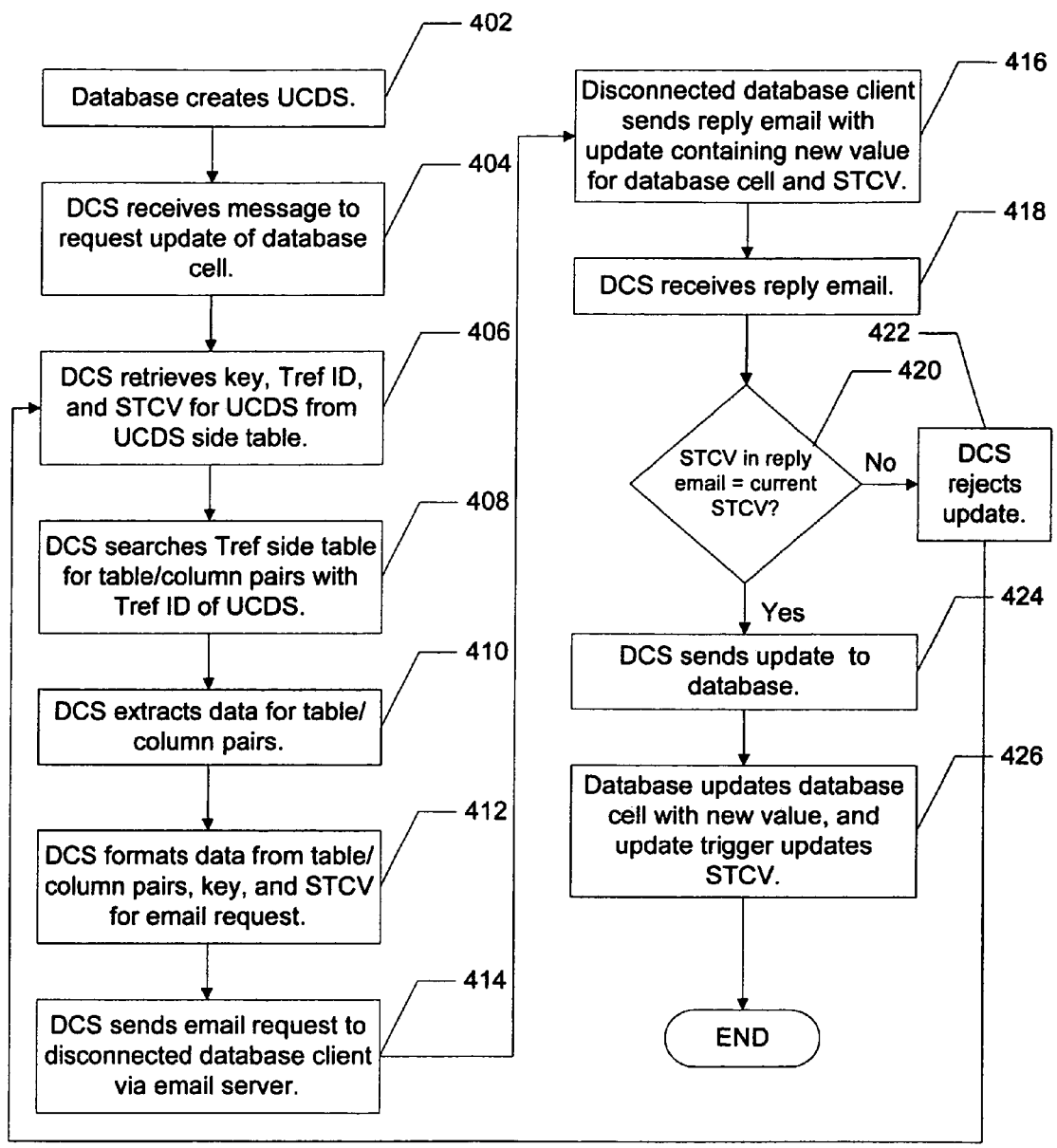
FIG. 4 is a flowchart illustrating in more detail the preferred embodiment of the method for performing real-time database update transactions with disconnected database clients in accordance with the present invention.

FIG. 4 is a flowchart illustrating in more detail the preferred embodiment of the method for performing real-time database update transactions with disconnected database clients in accordance with the present invention. Referring to both FIGS. 3 and 4, first, the database 112 creates the UCDS 116, via step 402, using the administration commands 134 of the DCE 114. In the preferred embodiment, the UCDS 116 comprises the database cell 118 to be updated and its associated database cells 120. Assume for example that database cell 118 is U1 and the associated database cells 120 are D2 and D3, illustrated in FIG. 3. When the UCDS 116 is first created, the update, insert and delete triggers 132 are placed on each of the columns U1, D2, and D3. The administration command 134 creates the UCDS side table 314 and references for the UCDS 116 in the Tref side table 320. The UCDS side table 314 contains a UCDS record, which comprises the key 304 for the database cells 118 and 120, the unique Tref ID 316, and the STCV 122 for the UCDS 116. As a value in a UCDS column/key intersection changes, the update triggers on the columns will update the STCV 122 in the UCDS side table 314.

Next, the DCS 110 receives a message to request an update of the database cell 118, via step 404. For example, the disconnected database client 102 may send the message to the DCS 110 that he/she wants to update a particular database cell. The DCS 110 then retrieves the key 304, the Tref ID 316, and the STCV 122 from the UCDS side table 314, via step 406. The DCS 110 searches the Tref side table 320 for the table/column pairs with the Tref ID 3 16, via step 408. The DCS 110 then extracts the data from the table/column pairs, via step 410. In the illustrative example, the table/column pairs for the UCDS 116 is Table One/column 1 for U1; Table Two/column 2 for D2; and Table Two/column 3 for D3. The DCS 110 formats the data from the table/column pairs, the key 304, and the STCV 126 for the email request 124, via step 412. At this time, the STCV 126 in the email request 124 matches the STCV 122. The key 304 identifies the row of the cell 118 in the table/column pair that is to be updated. The DCS 110 then sends the email request 124 to the client 102 via the email server 104, via step 414. The client 102 sends a reply email 128 with an update 130 containing a new value for the database cell 118 and the STCV 126, via step 416. The DCS 110 receives the reply email, via step 418, via the email server 104. The DCS 110 then determines if the STCV 126 in the reply email 128 matches the current STCV 122 of the UCDS 116, via step 420. If they match, then the DCS 110 sends the update 130 to the database 112, via step 424. The database 112 updates the cell 118 with the new value, and then the update trigger updates the STCV 122, via step 426. If the STCV 126 in the reply email 128 does not match the current STCV 122 of the UCDS 116, then the DCS 110 rejects the update 130, via step 422. The DCS 110 then repeats steps 406 through 420.

For example, assume that the method and system in accordance with the present invention are used by an office products service shop which has ten service representatives in the field. All of the service representatives have email enabled cellular phones. Assume also that the central office of the shop has a call dispatch system that is integrated into a database. A call information, such as customer name, address, and problem description is entered into the database 112 as a database record with an updateable cell 118 being an "Assigned To" field.

Assume that the database 112 creates an UCDS 116 with this database cell 118, via step 402. The UCDS 116 comprises the database cell 118 that contains the "Assigned To" field and any associated database cells 120 the service representatives need to perform an update. The DCS 10 receives a message to request the update of the database cell 118 from each of the ten service representatives in the field, via step 404. The DCS 110 then retrieves the key 304, the Tref ID 316, and the STCV 122 of the UCDS 116 from the UCDS side table 314, via step 406. The DCS 110 formats the email requests 124 to the service representatives, via steps 408-412. At this time, the STCV's 126 in the email requests 124 match the STCV 122. The DCS 110 sends the email requests 124 to the cellular phones of each of the ten service representatives, via step 414.

The service representatives receive their respective email requests. Assume that a first service representative sends a reply email 128 with an update 130, via step 416. The reply email 128 also comprises the STCV 126.

The DCS 110 receives the reply email 128 from the first service representative, via step 418. Assume that the DCS 110 determines that the STCV 126 in the reply email 128 matches the current STCV 122 of the UCDS 116, via step 420. The DCS 110 then sends the update 130 of the database cell 118 to the database 112, via step 424. The database 112 uses the update trigger on the database cell's column to update the database cell 118 and the STCV 122, via step 426.

Assume that a second service representative sends a reply email 128, via step 416, after the database cell 118 has been updated by the first service representative. The DCS 110 receives the reply email 128, via step 418. Since the STCV 122 has been changed by the first service representative's update, the DCE 110 determines that the STCV 126 in the second service representative's reply email 128 do not match the current STCV 122, via step 420. The DCS 110 then rejects the update 130 from the second service representative, via step 422. The DCS 110 then retrieves the current key 304, Tref ID 316, and the current STCV 122 from the UCDS side table 314, via step 406. The DCS 110 repeats steps 408-412 and sends a second email request 124 to the second service representative, via step 414. The second email request 124 comprises the database cell 118 updated by the first service representative and an updated STCV 126. The updates STCV 126 is the same as the STCV 122 at the time the second email request 124 was created.

The second service representative receives the second email request 124 and sends a second reply email with a new update 130 and the STCV 126, based on the database cell 118 and associated database cells 120 as updated by the first service representative, via step 416. The DCS 110 receives the second reply email 128, via step 418. Assume that no further updates of the database cell 118 or its associated database cells 120 has occurred since the second email request 124 was created. The DCE 110 thus determines that the STCV 126 in the second reply email 128 matches the current STCV 122 of the UCDS 116, via step 420. The DCS 110 sends the new update 130 from the second service representative to the database 112, via step 424. The database 112 uses the update trigger of the database cell's column to update the database cell 118 and the STCV 122, via step 426.

Although the present invention has been described with one UCDS, one of ordinary skill in the art will understand that more than one UCDS, each with its own side table, can be used without departing from the spirit and scope of the present invention.

Although the present invention has been described in the context of emails, one of ordinary skill in the art will understand that anything which can package data and transmit data between a sender and a receiver, without the sender being directly connected to the receiving system, or the receiver being directly connected to the sending system, may be used without departing from the spirit and scope of the present invention.

An improved method and system for performing real-time database update transactions with disconnected database clients have been disclosed. The system comprises a DCS at the database server and DCE and a UCDS at the database. The DCS formats the database cell to be updated, its key, any associated database cells, and a timestamp and sends them to a disconnected database client by email. The timestamp indicates the last time the database cell or its associated database cells was changed. The disconnected database client sends a reply email with the update of the database cell and the timestamp. Upon receipt of the reply email, the DCS compares the received timestamp to a current timestamp for the database cell. If they match, then the database cell is updated according to the received update. If they do not match, then the database cell or its associated database cells has been changed since the update request was created. The update is thus based on outdated information and is rejected. In this manner, reliable real-time update transactions are provided between a disconnected database client and the database.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for performing real-time update transactions between a database system and remote database clients, the method comprising:
   the database system sending to a remote database client an update request to update data in the database system, the update request comprising
      a first timestamp indicating a last time the data in the database system was previously modified as of a time of the update request; and
      a first checksum value corresponding to a state of the data in the database system as of the time of the update request;
   responsive to the remote database client receiving the update request, the remote database client sending to the database system a reply to the update request, the reply including
      a new value for the data in the database system;
      the first timestamp corresponding to a state of the data in the database system as of the time of the update request; and
      the first checksum value corresponding to the state of the data in the database system as of the time of the update request;
   the database system determining whether the first timestamp matches a second timestamp indicating a last time the data in the database system was previously modified as of a time that the database system received the reply, the database system further determining whether the first checksum value matches a second checksum value corresponding to the state of the data in the database system as of the time that the database system received the reply; and
   responsive to the first timestamp matching the second timestamp and the first checksum value matching the second checksum value, updating the data in the database system with the new value for the data, otherwise rejecting the reply.

2. The method of claim 1, wherein the remote database client and the database system communicate via an email server.

3. The method of claim 2, wherein each of the update request and the reply is comprised in an email.

4. The method of claim 2, wherein:
   the database system sending to a remote database client an update request comprises the database system
   formatting the update request into an email request; and
   the method further includes the email server sending the email request to the remote database client.

5. A computer readable medium with program instructions for performing real-time update transactions between a database system and remote database clients, the program instructions comprising instructions for:
   the database system sending to a remote database client an update request to update data in the database system, the update request comprising
      a first timestamp indicating a last time the data in the database system was previously modified as of a time of the update request; and
      a first checksum value corresponding to a state of the data in the database system as of the time of the update request;
   responsive to the remote database client receiving the update request, the remote database client sending to the database system a reply to the update request, the reply including
      a new value for the data in the database system;
      the first timestamp corresponding to a state of the data in the database system as of the time of the update request; and
      the first checksum value corresponding to the state of the data in the database system as of the time of the update request;
   the database system determining whether the first timestamp matches a second timestamp indicating a last time the data in the database system was previously modified as of a time that the database system received the reply, the database system further determining whether the first checksum value matches a second checksum value corresponding to the state of the data in the database system as of the time that the database system received the reply; and
   responsive to the first timestamp matching the second timestamp and the first checksum value matching the second checksum value, updating the data n the database system with the new value for the data, otherwise rejecting the reply.

6. The computer readable medium of claim 5, wherein the remote database client and the database system communicate via an email server.

7. The computer readable medium of claim 6, wherein each of the update request and the reply is comprised in an email.

8. The computer readable medium of claim 6 wherein:
   the instructions for the database system sending to a remote database client an update request comprise instructions for the database system to format the update request into an email; and
   the computer readable medium further comprises instructions for the email server to send the email request to the remote database client.

9. A method for performing an update transaction in a database system, the method comprising:
   sending to a remote database client an update request to update data in a database system, the update request comprising
      a first timestamp indicating a last time the data in the database system was previously modified as of a time of the update request; and
   a first checksum value corresponding to a state of the data in the database system as of the time of the update request;
      responsive to sending the update request to the remote database client, receiving a reply from the remote database client, the reply including
      a new value for the data in the database system;
      the first timestamp corresponding to a state of the data in the database system as of the time of the update request; and
      the first checksum value corresponding to the state of the data in the database system as of the time of the update request;
   determining whether the first timestamp matches a second timestamp indicating a last time the data in the database system was previously modified as of a time that the reply was received, the database system further determining whether the first checksum value matches a second checksum value corresponding to the state of the data in the database system as of the time that the reply was received; and responsive to the first timestamp matching the second timestamp and the first checksum value matching the second checksum value, updating the data in the database system with the new value for the data, otherwise rejecting the reply.

10. The method of claim 9, wherein each of the update request and the reply is comprised in an email.

11. A computer readable medium with program instructions for performing an update transaction in a database system, the program instructions comprising instructions for:

sending to a remote database client an update request to update data in a database system, the update request comprising a first timestamp indicating a last time the data in the database system was previously modified as of a time of the update request; and a first checksum value corresponding to a state of the data in the database system as of the time of the update request;

responsive to sending the update request to the remote database client, receiving a reply from the remote database client, the reply including a new value for the data in the database system;

the first timestamp corresponding to a state of the data in the database system as of the time of the update request; and the first checksum value corresponding to the state of the data in the database system as of the time of the update request;

determining whether the first timestamp matches a second timestamp indicating a last time the data in the database system was previously modified as of a time that the reply was received, the database system further determining whether the first checksum value matches a second checksum value corresponding to the state of the data in the database system as of the time that the reply was received; and responsive to the first timestamp matching the second timestamp and the first checksum value matching the second checksum value, updating the data in the database system with the new value for the data, otherwise rejecting the reply.

12. The computer readable medium of claim 11, wherein each of the update request and the reply is comprised in an email.

13. A system comprising:

database system configured to send to a remote database client an update request to update data in the database system, the update request comprising a first timestamp indicating a last time the data in the database system was previously modified as of a time of the update request; and a first checksum value corresponding to a state of the data in the database system as of the time of the update request;

responsive to the remote database client receiving the update request, the remote database client being configured send to the database system a reply to the update request, the reply including a new value for the data in the database system;

the first timestamp contending to a state of the data in the database system as of the time of the update request; and the first checksum value corresponding to the state of the data in the database system as of the time of the update request, wherein the data the database system is further configured to determine whether the first timestamp matches a second timestamp indicating a last time the data in the database system was previously modified as of a time that the database system received the reply, the database system further configured to determine whether the first checksum value matches a second checksum value contending to the state of the data in the database system as of the time that the database system received the reply; and wherein responsive to the first timestamp matching the second timestamp and the first checksum value matching the second checksum value, the database system is configure to update the data in the database system with the new value for the data, otherwise the database system is configured to reject the reply.

14. The system of claim 13, wherein each of the update request and the reply is comprised in an email.

* * * * *